United States Patent
White et al.

(10) Patent No.: US 6,600,478 B2
(45) Date of Patent: Jul. 29, 2003

(54) HAND HELD LIGHT ACTUATED POINT AND CLICK DEVICE

(75) Inventors: William George White, Poughkeepsie, NY (US); Moon Ju Kim, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 09/754,174

(22) Filed: Jan. 4, 2001

(65) Prior Publication Data

US 2002/0084980 A1 Jul. 4, 2002

(51) Int. Cl.[7] .................................................. G09G 5/08
(52) U.S. Cl. ...................... 345/157; 345/156; 345/158; 345/168; 345/169; 345/172; 345/173
(58) Field of Search .................... 345/1, 7, 8, 156–158, 345/168–169, 172–173, 179–183; 348/383, 36, 39

(56) References Cited

U.S. PATENT DOCUMENTS

| 5,063,376 A | 11/1991 | Chang ........................ 340/706 |
| 5,373,324 A | 12/1994 | Kuroda et al. .............. 348/468 |
| 5,481,622 A * | 1/1996 | Gerhardt et al. ........... 345/158 |
| 5,594,468 A * | 1/1997 | Marshall et al. ............ 345/156 |
| 5,617,548 A | 4/1997 | West et al. ................... 395/326 |
| 5,764,224 A | 6/1998 | Lilja et al. ................... 345/179 |
| 5,793,361 A | 8/1998 | Kahn et al. .................. 345/179 |
| 5,933,132 A * | 8/1999 | Marshall et al. ............ 345/158 |
| 5,956,736 A | 9/1999 | Hanson et al. .............. 707/513 |
| 5,963,145 A * | 10/1999 | Escobosa ............... 340/825.72 |
| 5,969,712 A | 10/1999 | Morita et al. ............... 345/179 |
| 6,097,373 A * | 8/2000 | Jakobs ........................ 345/158 |
| 6,424,335 B1 * | 7/2002 | Kim et al. ................... 345/158 |

* cited by examiner

Primary Examiner—Bipin Shalwala
Assistant Examiner—Leonid Shapiro
(74) Attorney, Agent, or Firm—Norman Gundel

(57) ABSTRACT

Multiple light emitting diodes (LEDs) capable of emitting light at different optical wavelengths are provided in a hand held device with switches for activating the LEDs separately or jointly. A matrix of radiant energy detectors are arrayed across a presentation screen at the display pixel locations of a screen. These radiant energy detectors are capable of distinguishing between the two radiant energy sources. A position location matrix is provided on the screen for detection where radiant energy is received from one or more of the radiant energy sources. Detection signal logic provides Boolean signals representative of which of the radiant energy signals is detected by the radiant energy detectors and control function logic responds to the position information and the Boolean signals to generate a cursor on a display screen and to manipulate display objects on the screen intercepted by the cursor.

18 Claims, 5 Drawing Sheets

HAND HELD LIGHT ACTUATED POINT AND CLICK DEVICE

FIELD OF THE INVENTION

This invention relates to a pointing device for human interaction with a computer or television display screen.

BACKGROUND OF THE INVENTION

Light pens, touch pads, computer mice, touch screens, and other electromechanical and electronic pointers are used in connection with computer generated displays. Pointing with the device may be direct pointing along a line of sight to a target (as when a pointing device, such as a light pen, is directly aimed at a portion of display of a radiated or otherwise projected image) or indirect pointing (as when a mouse is manipulated to control the position of an image of a pointer on a display, without pointing the mouse itself at the display).

When the pointing device is directed to a place on an object which is being shown on an electronic display (e.g., to a command icon appearing on a CRT), the act of pointing must be linked by some sort of electronic processing to the target command icon. In the case of a mouse, the identity of the target command icon may be inferred from the location of a cursor on the display at the time of a mouse click. In the case of a light pen, the raster scanning of the display permits a one-to-one mapping of moments in time to points on the display screen so that the moment when light from the target location is detected by the pen implies the target location.

In the past, it was recognized that it would be desirable to have a direct pointing device, such as a light pen, that performs functions provided by an indirect pointing device, such as a mouse, so that the single direct pointer would perform both direct and indirect pointing device functions. However, up to now no such single device which adequately performs both functions has been developed.

Therefore, it is an object of the present invention to provide a new direct pointing device that performs mouse functions.

It is another object of the present invention to provide a system in which functions performed on a direct pointing device can be detected by a computer screen.

It is a further object of the present invention to provide a new computer screen arrangement for optically detecting function commands made on a cordless direct pointing device.

SUMMARY OF THE INVENTION

In accordance with the present invention, multiple light emitting diodes capable of emitting light at different optical wavelengths are provided in a hand held device with switches for activating the light emitting diodes separately or jointly. A matrix of radiant energy detectors are arrayed across a presentation screen at the display pixel locations of the screen. These radiant energy detectors are capable of distinguishing between the two radiant energy sources. A position location matrix is provided on the screen for detection where radiant energy is received from one or more of the radiant energy sources. Detection signal logic provides Boolean signals representative of which of the radiant energy signals are detected by the radiant energy detectors, and control function logic responds to the position information and the Boolean signals to generate a cursor on the display screen and to manipulate display objects on the screen intercepted by the cursor.

DETAILED DESCRIPTION OF THE PREFERRED EMBODIMENT

Figure 1:
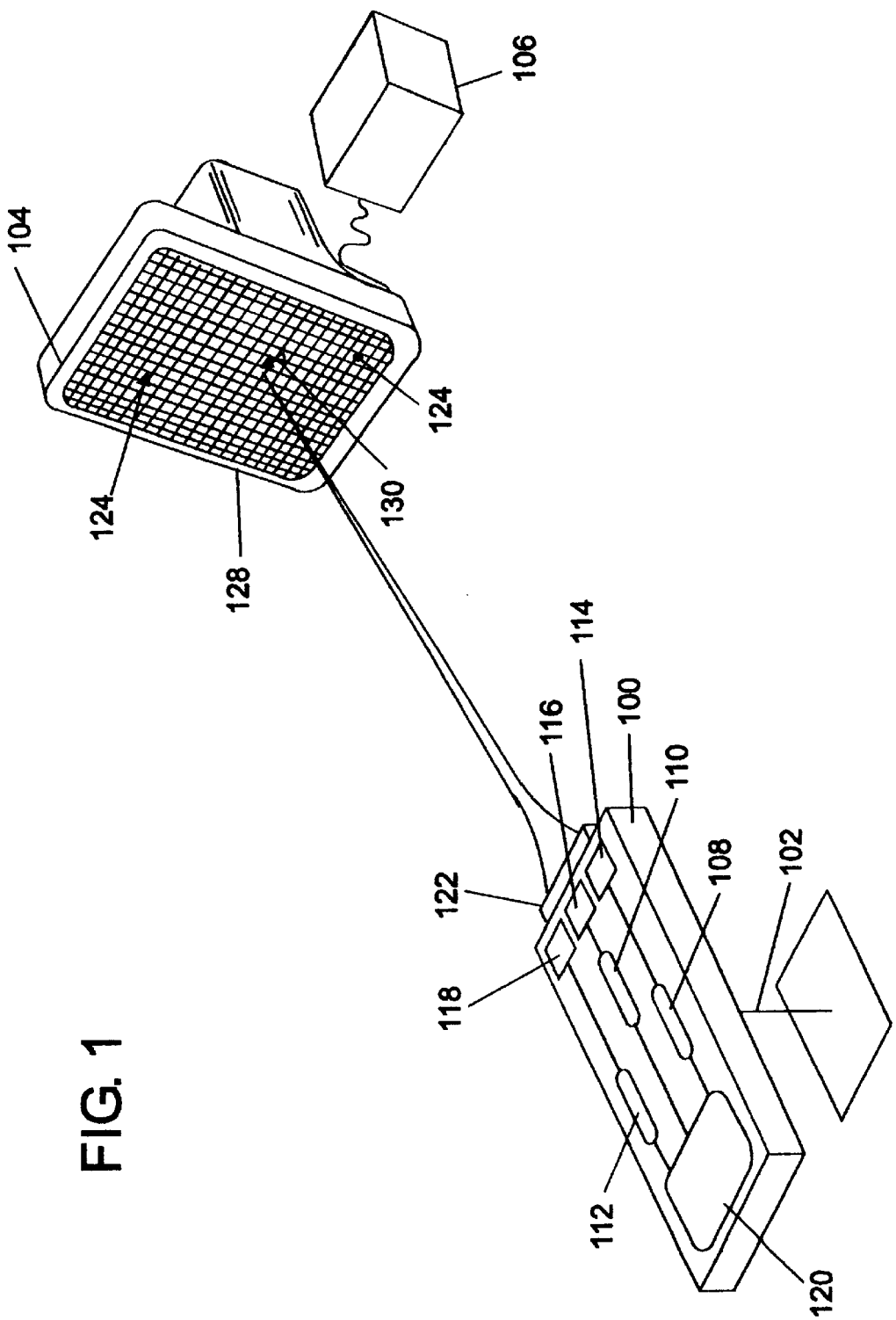
FIG. 1 is a schematic diagram illustrating one embodiment of the invention in which a hand held device contains three light emitting diodes emitting different optical wavelengths.

Now referring to FIG. 1, optical pointer 100 is mounted on a base 102 with a pivot that permits movement of the pointer in the x, y and z directions enabling a user of the pointer to scan the display screen 104 of a computer 106. The base provides stability to accurately position the pointer. However, use of the pointer is possible without the base and the pointer can be removed from the base for hand held operation.

By manipulation of the buttons 108, 110, 112, the user can activate light emitting diodes 114, 116, 118 from the source 120 to direct a single color or multicolored light beam at the screen. The pointer has a columnating lens or lens set 122 which focuses the generated light at the screen to a spot size approximating the spacing between the pixels 124 on the display screen. The display screen contains a conductive grid 128, with intersections at each of the pixel locations, connecting the pixel locations to activation logic responsive to light from the pointing device.

Figure 2:
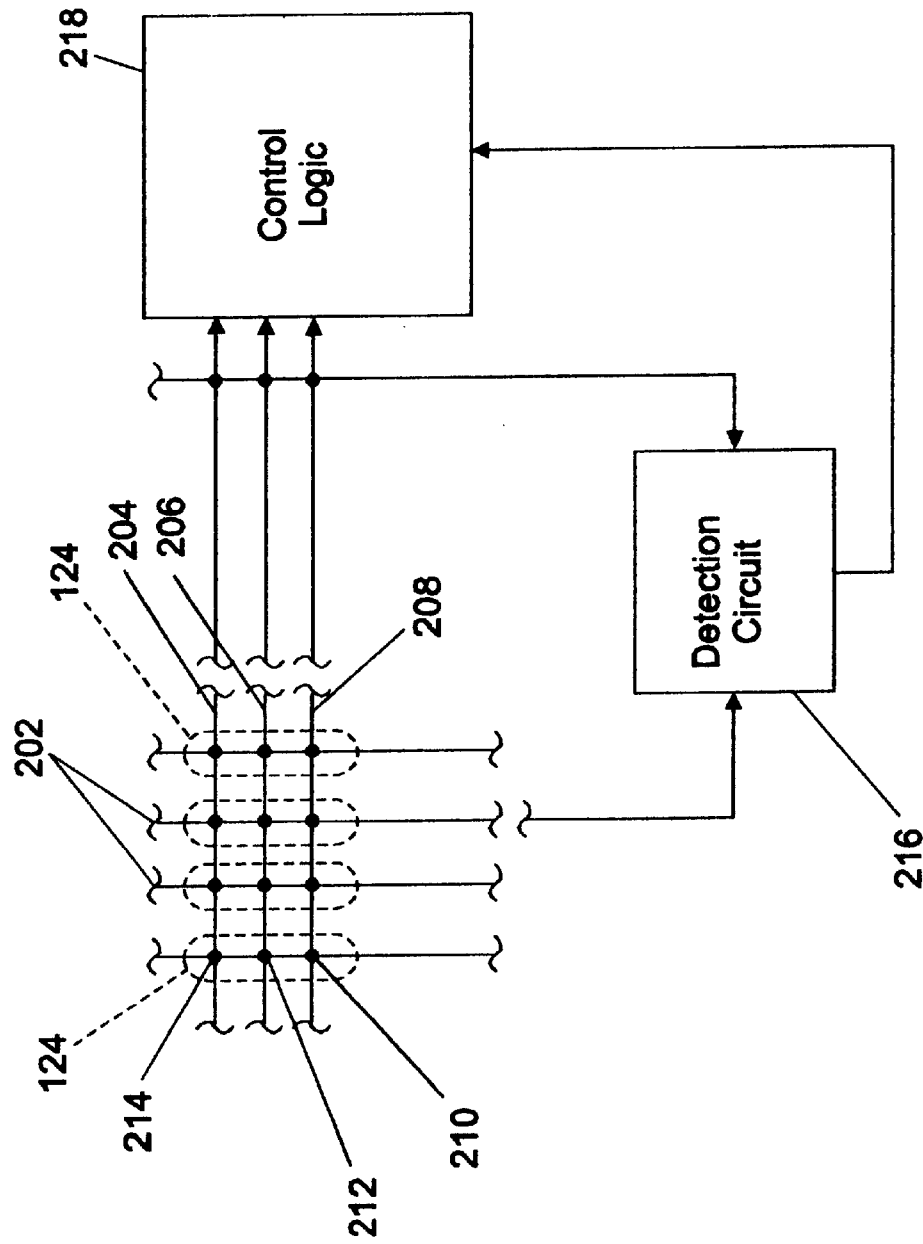
FIG. 2 is an electrical schematic representation of a portion of the screen of FIG. 1 and electrical circuits responsive to the screen of FIG. 1.

As shown in more detail in FIG. 2, each of the pixels 124 is intercepted by one vertical line 202 of the grid 128 and three horizontal lines 204, 206 and 208 of the grid 128. At the intersection of each horizontal line with each vertical line in the grid, there is located a light sensitive diode so that associated with each pixel 124 there are three light sensitive diodes 210, 212 and 214. Conductivity of each of the diodes 210 to 214 is matched to one of the optical band widths of the light emitting diodes. When light is detected by any of the diodes 210 to 214, a electrical connection is made between the vertical and at least one of the horizontal lines intercepting that diode. With such a connection, current flows through the two lines intersecting at the diode thereby enabling position detection circuit 216 to detect the pixel location on the screen impinged by the light dot. Further, a signal is transmitted to control logic 218 to perform functions requested by the action of the user on the pointer.

Figure 3:
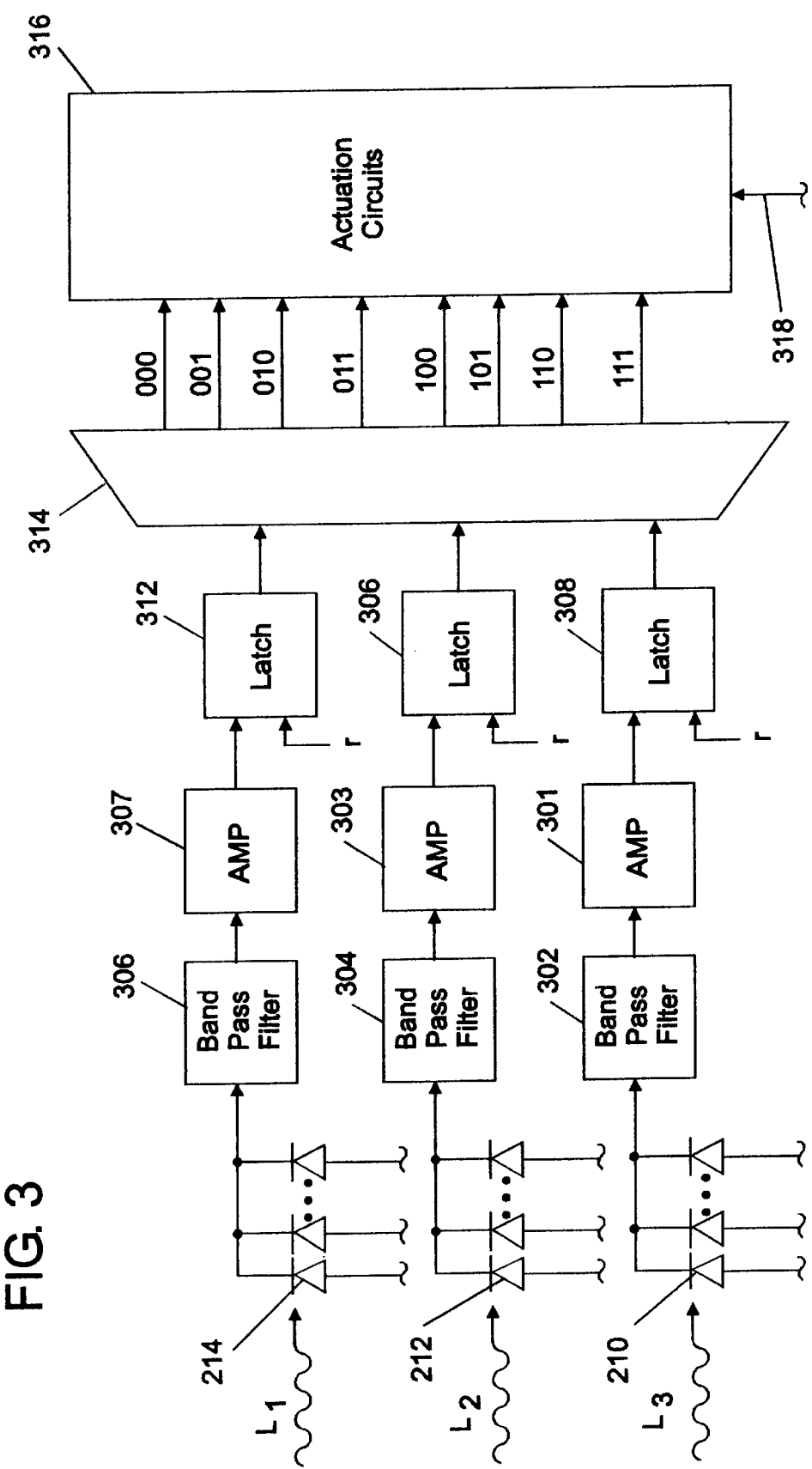
FIG. 3 is a more detailed schematic diagram of the detection circuit and associated actuation circuitry of FIG. 2.

As shown in FIG. 3, the diodes at each of the pixel locations pass through a band pass filter 302, 304 and 306. All the diodes for one color pass for all horizontal lines in the grid through the same band pass filter. Thus there are only three band pass filters for all the diodes in the system. The band pass filters are tuned to pass only the largest portion of the signal generated by the conduction of the diode 214 so that the circuitry after the filter is not responsive to incident light or light from the other diodes that may reach the screen and affect the operation of the system.

The outputs of the band pass filters are fed through amplifiers 301,303 and 307 into latches 308, 310 and 312 which latch the outputs of the band pass filters and provide them to a decoder 314 that provides a Boolean signal representative of the outputs of the diodes. The decoder decodes the three signals received from the latches into one of eight outputs. If none of the diodes 210 to 214 is energized by light from the appropriate LED, the 000 line is activated. If one of the diodes 210 to 214 is so energized, the output of the decoder 314 can be either line 001, 010 or 100 depending on the diode energized. If two outputs of the LEDs 114 to 118 are detected as energized by two of the diodes 210 to 214, the output of the decoder is on line 011, 101 or 110 with light from all three LEDs detected the decoder output is on line 111.

The output of the decoder is fed into the actuation circuitry 316 which also receives the position information on the location of the spot on line 318 from the detection circuit 216. With this information various functions can be performed on what ones of the devices have been activated by the light source. For instance, with none of the LEDs activated, the 000 line of the decoder 314 is up and no cursor on the screen. With one or more of the LEDs activated, one of the other output lines of the decoder is up and a cursor 130 appears on the screen of FIG. 1. Each of the seven outputs 001 to 111 of the decoder can be used to initiate a function to be performed by the actuation circuits 316.

With seven such separate selectable decoder outputs available to the user, the decoder enables the user to perform mouse functions with the pointer of the present invention. For instance by selecting one of the buttons 108 to energize line 001 while moving the pointer, the user can direct the cursor 130 to an icon on the display screen. Selection of the icon function can be performed by depressing a second button 110 while still depressing the first button 108 to energize line 011. To drag the icon across the screen once the cursor is in place, button 112 is depressed energizing line 010. When the pointer is moved with button 112 depressed, the selected item follows the light spot across the screen. When the desired location is reached, button 110 is depressed energizing line 110 to drop the item into the desired location. The above described functions are only examples of how the pointing device can be operated to perform the desired functions. Other combinations are possible by activating other output lines of the decoder that can be used to select other functions and used for other purposes. The reset inputs r of the latch are controlled by the activation circuits which reset the latches after the function is performed or after a time out period has elapsed. Also, a reset function can be initiated by the user by selection of a particular button or combination of buttons: for instance, depressing button 110 or all three buttons would energize line 100 or 111 which could be used to send a reset signal to the three latches.

Figure 4:
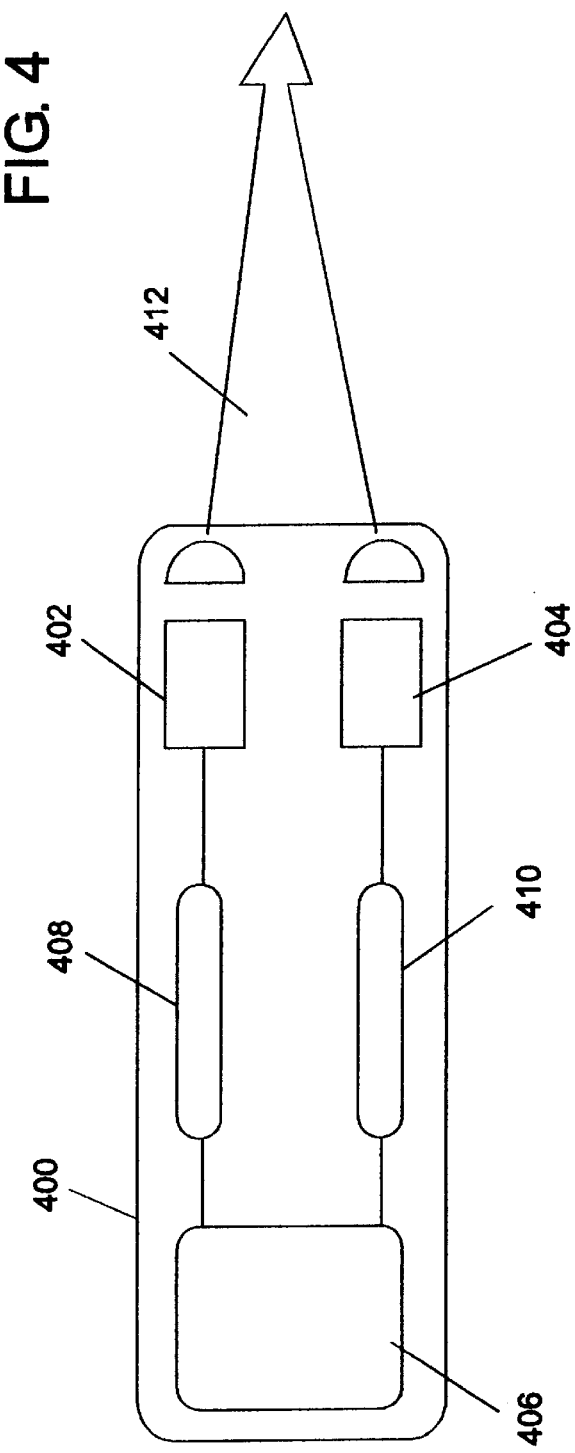
FIG. 4 is a schematic diagram an alternate embodiment a hand held device of the present invention including two light emitting diodes.

An alternative embodiment of the pointing device is shown in FIG. 4. Here the pointing device 400 contains two light emitting diodes 402 and 404 operating on different wavelength bands of the visible spectrum. Selection of one or both of the diodes for connection to the power supply 406 is made by switches 408 and 410 which can be activated singly to energize one of the diodes or together to energize both of the diodes. A columinating lens 412 provides light from either or both of the diodes in a fine beam directed at a selected point on the screen of FIG. 1.

Figure 5:
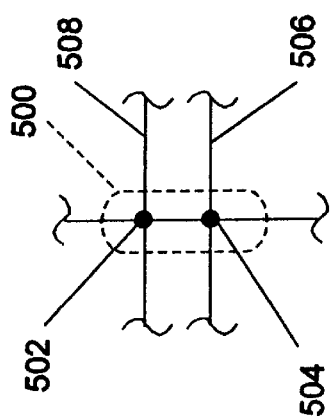
FIG. 5 is a schematic diagram of a portion of an alternate embodiment of the screen of FIG. 1.

As shown in FIG. 5, at each pixel 500 in the screen there are two light detecting diodes 502 and 504 which detect light beamed at that point on the screen. These diodes each make a connection between one horizontal line 506 and 508 and one vertical line 508 of the grid of FIG. 1 so that current flows between the vertical and horizontal lines and is detected by positioning detecting circuitry 216 of FIG. 2.

Figure 6:
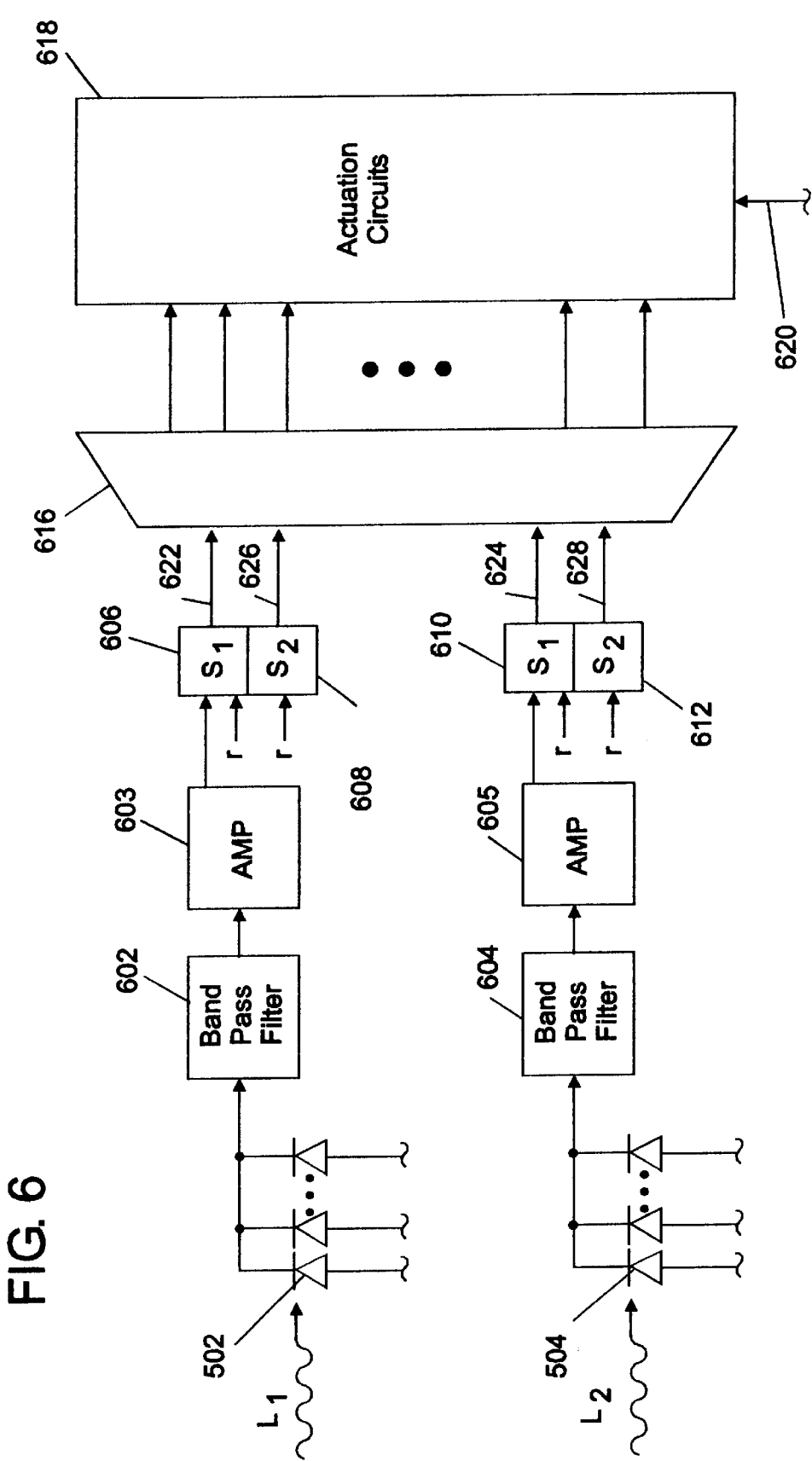
FIG. 6 is a schematic diagram of the actuation circuits for the embodiment of FIG. 4.

The diodes at the energized pixel area are connected along with all of the other diodes in the matrix to the circuitry shown in FIG. 6. Each of the diodes 502 and 504 is connected to a band pass filter 602 and 604. The outputs of the band pass filters are each fed to circuitry that includes two sets of latches 606 and 608 and 610 and 614 for each path. The outputs of these latches are fed through an amplifier 603 or 605 to a decoder 616 which therefore has four inputs for selection of one of 16 different possible outputs. These outputs go to the function performing circuitry 618 for the pointer which also receives a signal on line 620 from the detection circuit 216 indicating the position of the light beam on the screen.

Functions are performed by selecting either switch singly or both switches together. If a switch is clicked once, it results in a binary "1" signal on input 622 or 624 of the decoder 616. By clicking the same switch twice, a binary "1" signal, also being placed on inputs 626 and 628 of the decoder. Therefore it can be seen that this pointer and screen configuration permits a pointer to perform a significant number of functions such as those necessary to duplicate the actions of a mouse. Selection of the particular functions to be performed will depend on choices made by a designer.

Above we have described two embodiments of the present invention. Obviously a number of modifications and additions to those embodiments will be apparent to those skilled in the art. Therefore it should be understood that the invention is not limited to the two disclosed embodiments but also encompasses the spirit and scope of the appended claims.

What is claimed is:

1. Apparatus for selection and manipulation of a screen presentation comprising:
    a hand held device containing at least two radiant energy sources and switches for activating those sources individually or jointly;
    a matrix of radiant energy detectors arranged across a presentation screen at display pixel locations of the screen which radiant energy detectors in combination with circuits responsive thereto are for distinguishing each of the multiple radiant energy sources from the other;
    a position location matrix and logic circuit for providing position information on where radiant energy from one or more of the radiant energy sources is detected by at least one of the radiant energy detectors;
    control signal logic generating output signals representative of combinations of one or more radiant energy signals from the radiant energy sources that are detected by the radiant energy detectors; and
    control function logic responsive to the position information and the output signals to generate a cursor on the display screen and to manipulate display objects on the screen intercepted by the cursor.

2. The apparatus of claim 1 wherein, the display screen is a computer screen.

3. The apparatus of claim 1 wherein, the display screen is a television screen.

4. The apparatus of claim 1, wherein said radiant energy sources are light emitting diodes providing emissions in different bands of the visible spectrum.

5. The apparatus of claim 4, wherein different ones of said radiant energy detectors associated with the same pixel are each responsive to a different one of the different bands of the visible spectrum.

6. The apparatus of claim 5, wherein said control signal logic is a decoder decoding outputs of the different ones of the radiant energy detectors associated with the same pixel to provide an output signal on one of $2^n$ output lines for the decoder.

7. The apparatus of claim 6 including band pass filters between the radiant energy detectors and the decoder to cut down noise due to ambient light.

8. The apparatus of claim 1 including a mounting device for the hand held device which allows movement on the mounting device enabling accurate positioning of the pointer.

9. The apparatus of claim 6, wherein there are two radiant energy devices and two detectors and there are shift registers with at least two stages each stage providing an output to one of the inputs of the decoder.

10. The apparatus of claim 6, wherein there are three radiant energy sources and three detectors.

11. A method for selection and manipulation of screen presentation comprising:
   having a hand held device containing at least two radiant energy sources and switches for activating those sources individually or jointly;
   providing a matrix of radiant energy detectors arranged across a presentation screen at display pixel locations of the screen which radiant energy detectors in combination with circuits responsive thereto are capable of distinguishing between the two radiant energy sources;
   providing position information on where radiant energy from one or more of the radiant energy sources is detected by at least one or the radiant energy detectors;
   generating an output signal representative of radiant energy signals generated by the radiant energy sources and detected by the at least one of the radiant energy detectors; and
   responding to the position information and the output signal to generate a cursor on the display screen and to manipulate display objects on the screen intercepted by the cursor.

12. The apparatus of claim 11 including using light emitting diodes providing emissions in different bands of the visible spectrum as the radiant energy sources.

13. The method of claim 12 having the radiant energy detectors each responsive to one of the bands of the visible spectrum emitted by the light emitting diode.

14. Apparatus for selection and manipulation of a screen presentation comprising:
   a hand held device containing multiple radiant energy sources and switches for activating those sources individually or jointly;
   a matrix of radiant energy detectors arranged across a presentation screen at display pixel locations of the screen which radiant energy detectors in combination with circuits responsive thereto are for distinguishing the multiple radiant energy sources one from the other;
   a position location matrix and logic circuit for providing position information on where radiant energy from one or more of the radiant energy sources is detected by at least one of the radiant energy detectors;
   control signal logic generating output signals representative of radiant energy signals from radiant energy sources detected by the radiant energy detectors;
   control function logic responsive to the position information and the output to generate a cursor on the display screen and to manipulate display objects on the screen intercepted by the cursor; and
   a mounting device for the hand held device which allows pivoting to enable accurate positioning of the pointer.

15. The apparatus of claim 14, wherein said radiant energy sources are light emitting diodes providing emissions in different bands of the visible spectrum.

16. The apparatus of claim 15, wherein different ones of said radiant energy detectors associated with the same pixel are each responsive to a different one of the different bands of the visible spectrum.

17. The apparatus of claim 16, wherein said control signal logic is a decoder decoding outputs of the different ones of the radiant energy detectors associated with the same pixel into one of $2^n$ output line for the decoder where "n" is the number of detectors.

18. The apparatus of claim 6, wherein there are at least two detectors for each pixel and there are shift registers with at least two stages each stage providing an output to one of the inputs of the decoder.

\* \* \* \* \*